United States Patent [19]
Kidd

[11] 3,867,808
[45] Feb. 25, 1975

[54] FORAGE HARVESTERS

[76] Inventor: Archibald Watson Kidd, Seend Close, Seend, Melksham, England

[22] Filed: Apr. 20, 1973

[21] Appl. No.: 352,979

[30] Foreign Application Priority Data
Apr. 25, 1972  Great Britain.................... 19238/72

[52] U.S. Cl............................. 56/14.1, 56/DIG. 1
[51] Int. Cl........................................... A01d 47/00
[58] Field of Search............... 56/DIG. 1, 13.3, 13.4, 56/14.1, 14.3, 14.4, 364

[56] References Cited
UNITED STATES PATENTS
3,023,560  3/1962  Krahn................................ 56/14.4
3,473,305  10/1969  Cyr................................... 56/DIG. 1
3,546,861  12/1970  Cleudenin......................... 56/DIG. 1
3,722,190  7/1972  Fisher.............................. 56/DIG. 1

*Primary Examiner*—Louis G. Mancene
*Assistant Examiner*—J. N. Eskovitz

[57] ABSTRACT

A forage harvester with upper and lower sets of feed rollers for compressing a gathered crop, each upper feed roller being mounted near one end of a relatively long shaft driven from its other end through a universal joint, the end carrying the roller being mounted in a bearing capable of rise and fall movement restrained by a spring.

10 Claims, 8 Drawing Figures

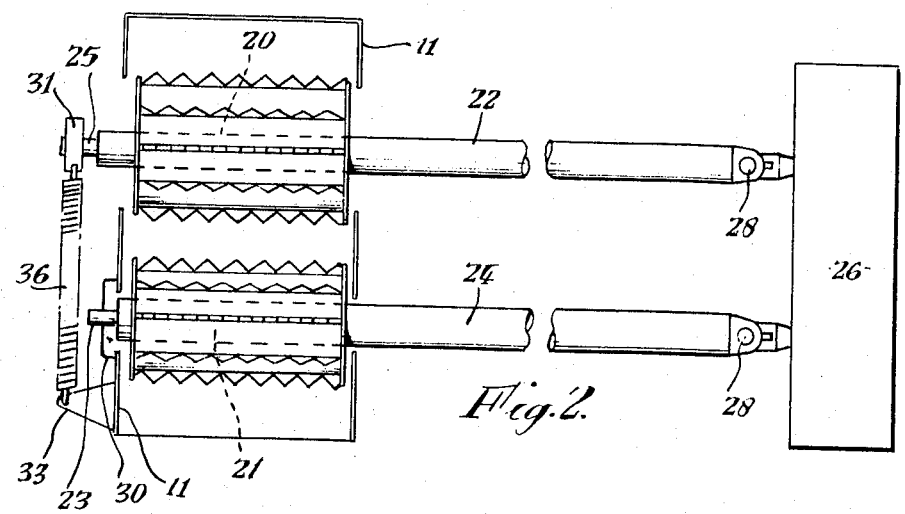
Fig. 2.
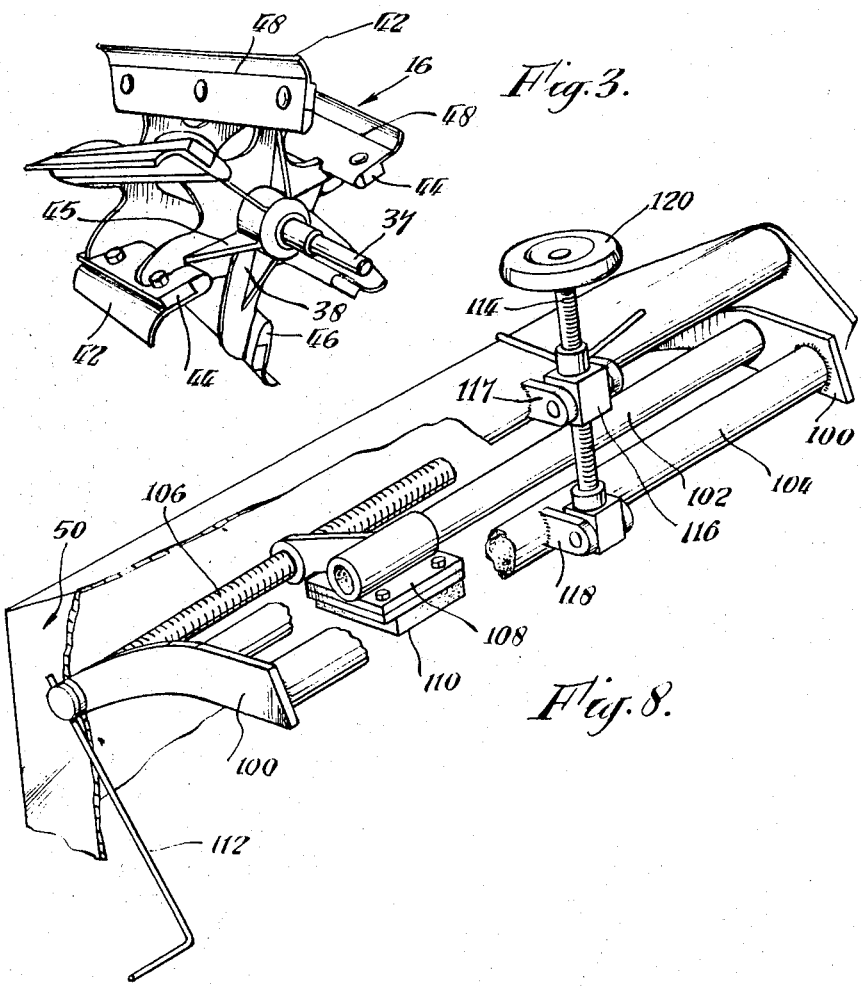
Fig. 3.
Fig. 8.

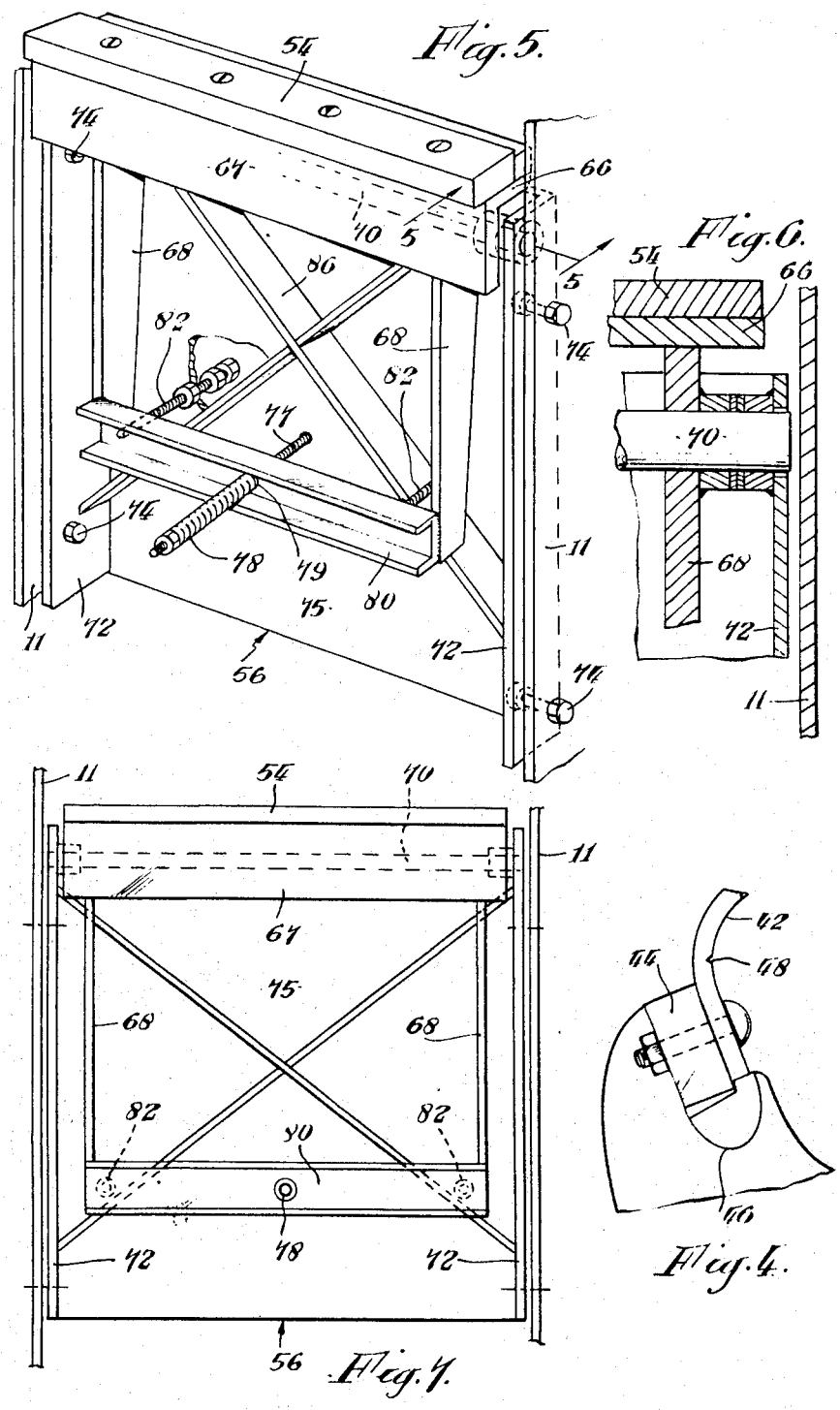

FORAGE HARVESTERS

This invention relates to forage harvesters and more particularly to harvesters of the kind variously known as full-chop, precision chop or metered-chop, such harvesters have means for feeding the crop into an assembly of feed rollers which compress it and delivers it in the form of a light wad to a cylinder chopper.

A common problem with known machines of this type is that there is a complicated mechanism associated with the rollers which compress the crop. For example it is known to have several rollers with fixed axes arranged transversely across the bottom of the feeding-in passage and another set of rollers similarly arranged across the top, except that the top rollers are normally arranged to be spring loaded in a downward direction and have their bearings arranged on radius arms, slides or other means allowing the rollers to move up and down according to the spring pressure and volume of forage to be dealt with at any given instant. Each of these upper rollers has some form of parallel gear to ensure that its axis retains a nominally horizontal position without tilting despite the rise and fall of the roller as a whole.

Conventional machines as described above suffer from the defect that the drive to the feed rollers tends to become very complicated when taking into account the permitted rise and fall of the upper ones while furthermore the paralleling gear in itself provides further complication. Consequently these machines tend to be difficult to repair or service on a field-operation basis and even in a workshop are far from easy. One object of this invention is to overcome this disadvantage.

A problem with machines of this type is that solid objects, for example large stones or pieces of scrap metal, which are lying in a field can be picked up and fed into the chopping mechanism. Under such circumstances considerable damage can be caused to the machine. It is another object of this invention to provide a machine wherein such damage will be minimised.

Known sharpening devices for cylinder cutters or choppers normally include a sharpening stone to be screwed down more or less radially against the periphery of the cylinder blades and in nearly all cases there is some tendency for the stone to judder and other defects are manifest, among them the fact that it is possible to sweep the stone from side to side axially along the length of the blades at speeds which are much too fast to give a proper sharpening effect. It is a further object of this invention to provide an improved sharpening device.

In order that the invention may be understood more readily, an embodiment will be described with reference to the accompanying drawings, wherein:

FIG. 2 is a diagrammatic front elevation through the feed chamber, that is to say a diagrammatic section through the machine along the line 2—2 of FIG. 1, but for greater clarity showing only the first upper and lower feed rollers;

FIG. 3 is a perspective view of the chopping rotor;

FIG. 4 is a detail side elevation of part of the chopping rotor;

FIG. 5 is a perspective view of the ledger plate assembly;

FIG. 6 is a section at 5—5 on FIG. 5;

FIG. 7 is a rear view of the ledger plate assembly, and

FIG. 8 is a perspective view of a sharpening device.

Figure 1:
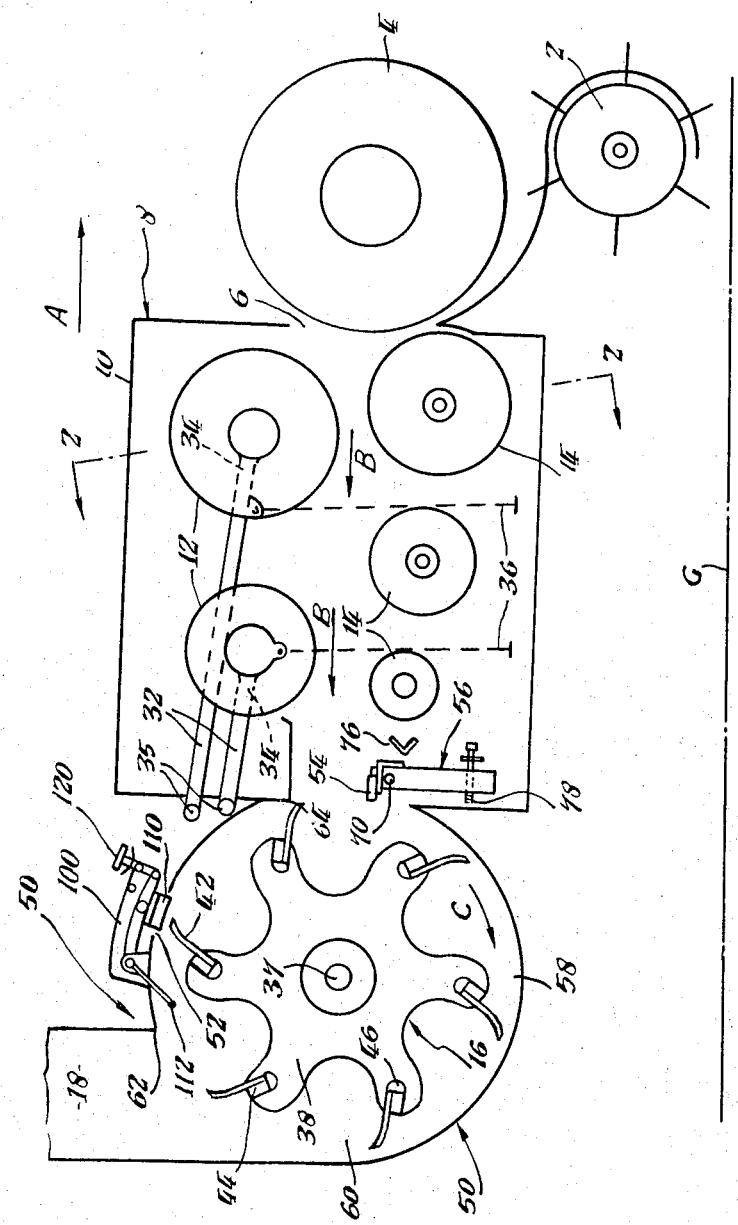
FIG. 1 is a diagrammatic side elevation of the machine in section.

Referring to the drawings, and more particularly to FIG. 1, the harvester travelling in the direction of the arrow A generally comprises a frame upon which are mounted a pick up reel 2, and an auger 4 both of known construction which pick up the cut crop from the ground G and pass it into the entrance 6 of the feed chamber 8. The feed chamber 8 comprises a casing 10 having side walls 11. The casing 10 houses upper feed rollers 12 and lower feed rollers 14. The crop is consolidated as it passes between the upper and lower rollers in the direction of the arrows B, and is then cut by the chopping rotor 16 rotating in the direction of the arrow C. The chopped crop is thrown out of the machine up the chute 18. The pick up reel 2, auger 4, feed rollers 12 and 14 and the chopping rotor 16 are all driven from the power take-off shaft of the towing tractor.

The upper and lower feed rollers 12 and 14 are fixed respectively on the end portions 20 and 21 of the shafts 22 and 24, which are driven from a gearbox 26 (not shown in detail) through universal joints 28. The lower rollers 14 rotate on fixed axes while the upper rollers 12 are permitted a restrained rise and fall movement to accomodate the mass of crop. The arrangement of the parts for effecting this is as follows:

The extremities 23 of the end portions 21 of the lower shafts 24 are mounted in bearings 30 rigidly fixed to the casing 10 of the machine. The extremities 25 of the end portions 20 of the upper shafts 22 are mounted in floating bearings 31 provided on the free ends 34 of radius arms 32 arranged in a plane at right angles to that of the shafts 22 and pivoted to the machine at 35. Slides can be substituted for the radius arms for controlling the pattern of movement of the upper rollers. Coil springs 36 are provided to bias the bearings in a downward direction. The lower ends of the coil springs 36 are fixed to brackets on the casing 10. If a thick mass of crop is fed to the rollers, the upper rollers 12 rise against the action of the springs 36. The shafts 22 tilt about the universal joints 28. The shafts 22 and 24 are made relatively long, so that the distance from the universal joints 28 to the ends of the rollers nearest the joints 28 is several times (e.g. 2½ times) the width of the rollers. As the upper rollers 12 rise, they cease to be truly parallel to the lower rollers 14, but because of the length of the shafts 22, the departure from a parallel condition is sufficiently small to be acceptable.

The gearbox 26 has as many horizontal outlet shafts on the side facing the feed chamber 8 as there are rollers in the feed chamber. In the case of a machine with top and bottom rollers as illustrated they are all driven as described. This special gearbox has outlet shafts arranged to give the appropriate speed and direction of rotation for each of the rollers concerned and the shafts 22, 24 are spaced approximately in the same configuration and distances apart as the feed rollers when in the normal working position. For instance, the top rollers 12 which rise and fall, are assumed to be approximately in their centre position when in line with their respective gearbox shafts.

The gearbox 26 can be conveniently belt driven. This being convenient as the slipping of the belt under overload conditions, such as a blockage in the feed chamber 8, provides a kind of safety clutch. Conveniently the gearbox 26 is treated as a structural member of the machine and the necessary height adjustment jacks or rams may be associated with suitable brackets mounted on the front of the box.

By providing suitable openings and unboltable cover plates as necessary in the sides of the feed chamber 8, any feed rollers can be taken out for examination or repair by merely unbolting the bearing and undoing the universal joint coupling of the drive shaft.

The chopping rotor 16 is fixedly mounted on a shaft 37 which is driven from the power take off shaft of the towing tractor. The bearings of the shaft 37 are made so as to break down under excessive shock so as to minimise damage in the event of the rotor striking a heavy object in use. The rotor 16 includes two spaced apart cheek plates 38 which between them carry, say, six blade supporting cross bars 44 arranged in a helical pattern to the front of which bars are bolted chopping blades 42. The cheek plates 38 are heavily scalloped away between points of attachment of the blades so as to allow free ingress of air from either end of the rotor to its central part. Each cheek plate is supported axially by six radial gusset plates 45.

The blades 42 have a forward lead at the cutting surface and the inner edge of each blade is provided with an aerofoil section 46 underneath the supporting bar 44.

As a further precausion to prevent excessive damage caused by solid material being fed into the chopping rotor 16 the cutting blades 42 have each a slight nick 48 rolled into one or both of their faces, along the whole length of the blade and at a point just adjacent to the supporting bar 44. In this way a blade can break off fairly easily under shock stress and relieve the enormous forces which would otherwise be generated.

The chopping rotor 16 operates inside the generally cylindrical casing 50 in which there are openings for the entry and exit of the crop, and also an opening 52 for a sharpening device for the blades of the rotor. To cut the crop, the blades 42 co-operate with a ledger plate 54 which forms part of a ledger plate assembly 56 described in greater detail later with reference to FIGS. 5, 6 and 7. The casing 50 is formed of relatively thin sheet metal in the region between the ledger plate assembly 56 and the lowest point of the casing indicated at 58, of thicker metal in the region between point 58 and the start of the exit chute at 60, and of still thicker metal in the regions lying generally above the rotor, between the points 62 and 64. In the event of a hard solid object being drawn into the machine, damage to the casing 50 is likely to be confined to the thinnest section (which is also most likely to receive the initial impact), or perhaps to the two sections below the rotor. These are accessible and easily replaced, while the sections above the rotor, which are least accessible for repair, are of the thickest material and thus least likely to be damaged. Moreover, deformation of the thinnest plate may absorb much of the momentum imparted to a stone or the like through collision with the rotor.

Referring now to FIGS. 5, 6 and 7 the ledger plate 54 is secured to a horizontal limb 66 of an L shaped support 67 which is rigidly mounted on two vertical members 68 pivotally carried by the pivot bar 70. This bar is carried in a pivot support which is U-shaped in cross section and the flanges 72 of the U are bolted to the side walls 11 of the casing 10 by bolts 74 which are of size and material chosen to withstand the stresses produced in normal operation of the machine, but to shear if a hard solid object gets between a blade 42 of the chopping rotor 16 and the ledger plate 54. The whole assembly will then drop, minimising damage to the rotor and to the ledger plate. The sliding plate is made of sufficient vertical depth in proportion to the width of the ledger plate than when the assembly drops, it is unlikely to twist in a generally vertical plane and become jammed in more or less its operative position. In any case, the sliding pivot support plate should be of a vertical depth at least comparable with the width of the ledger plate say at least three-fourths of the width of the ledger plate 54. A relatively heavy bar 76 is mounted between the side walls 11 of the feed chamber, between the ledger plate assembly 56 and that lower feed roller 14 which is nearest the back of the machine, so that if and when the bolts 74 shear, the ledger plate assembly 56 cannot be thrown forward into this roller 14.

Means are provided for the adjustment of the gap between the ledger plate 54 and the chopping blades 42. The vertical members 68 carrying the ledger plate are biased from the back 75 of the support plate by means of a compression spring 78 surrounding a pin 77 projecting from an aperture 79 in a cross bar 80 joining the vertical member 68. Such motion is limited by adjustable set screws 82 movable in tapped holes 84 in the back 75 of the pivot support plate. The back 75 is reinforced with ribs 86 to prevent buckling.

A sharpening device for the blades of the chopping rotor is provided, and is shown particularly in FIG. 8. This is designed to be operated while the rotor 16 is in motion, and has access to the rotor through the gap 52 in the casing 50. The sharpening device comprises a pair of end plates 100 joined by bars 102 and 104, and pivotally mounted on a screw threaded shaft 106 pivotally mounted on the casing 50. A carrier 108 is supported between the bar 102, and shaft 106 and has mounted on it a carborundum stone 110. The carrier can slide along bar 102, and is screw threaded to engage with the screw thread of shaft 106, so that it may be steadily traversed across the path of the blades by turning the handle 112 on the end of shaft 106. Means are provided to give a suitable rate of motion to the carrier, e.g: the pitch of the thread on the shaft 106.

It will be seen that a blade 42 of the rotor 16 will pass the shaft 106 before the stone 110 and this trailing arrangement of the sharpener reduces chatter. Automatic means are provided to screw down the stone by the appropriate amount each complete pass. The vertical position of the bar 104, and hence of the whole assembly is regulated by the screwed rod 114, passing through a nut 116 carried by brackets 117 on the casing 50. The lower end of the rod 114 is pivotally mounted at 118 to the bar 104.

In use, when it is desired to sharpen the blades 42 of the chopping rotor, the handle 120 on rod 114 is used to bring the carborundum stone 110 into contact with the blades. The handle 112 is then turned to traverse the stone across the blades, after which the stone may be lowered a little more with handle 120, and traversed across the blades again, the alternate lowering and traversing being continued until the desired amount of sharpening has taken place.

In order to allow a heavy trailer to be towed behind the machine without the front part of the machine being forced upwards, the point of attachment is located behind, but as close as possible to, the main axle of the machine, for example 6 or 8 inches behind the centre line of the axle.

What I claim and desire to secure by Letters Patent is:-

1. A forage harvester having means for picking up a crop, a feed roller assembly for comprssing the crop, and a cutting rotor for chopping up the compressed crop, the feed roller assembly comprising at least one rotatable shaft, a roller mounted fast on one end portion of said shaft with and elongate portion of said shaft projecting therefrom, said elongate portion being longer than the axial length of said roller, means for driving said shaft, and a pivotal coupling between said driving means and the end of said elongate portion of said shaft remote from the roller, said driving means being rotatably mounted to the harvester and the end of said shaft remote from said driving means being mounted for rise and fall movement so that the roller and shaft will swing together about said pivotal coupling.

2. A forage harvester according to claim 1 wherein upper and lower rollers are provided, between which the crop is passed, the shafts of each roller being driven through a pivotal coupling and the shaft of the upper roller being mounted in a floating bearing so as to be capable of restrained rise and fall movement.

3. A forage harvester according to claim 1, in which the pivotal coupling is a universal joint.

4. A forage harvester according to claim 1 wherein said shaft is unsupported between said pivotal coupling and the end of said roller which is furthest from the pivotal coupling.

5. A forage harvester according to claim 1 wherein the length of said elongate portion of said shaft is at least twice the length of said roller.

6. A forage harvester according to claim 1 having means for picking up a crop, a feed roller assembly for compressing the crop and a cutting rotor for chopping up the compressed crop, the feed roller assembly comprising at least one pair of opposed rollers between which the crop is passed, a rotatable shaft having first and second ends, one of said opposed rollers being mounted fast on one end portion of said shaft adjacent said first end, an elongate portion of said shaft extending between said second end and the roller mounted on the shaft, said elongate portion being at least equal in length to the length of said roller, means for driving said shaft, a pivotal coupling between said driving means and said second end of said shaft said driving means being rotatably mounted to the harvester, and a floating bearing with said first end of said shaft mounted in said floating bearing so as to be capable of restrained movement towards and away from the other of said opposed rollers said shaft being unsupported between said pivotal coupling and said floating bearing so that the roller mounted on the shaft and said shaft may swing together about said pivotal coupling.

7. A forage harvester according to claim 1 wherein that end of the said shaft remote from the pivotal coupling is mounted in a floating bearing capable of rise and fall movement, and means are provided for restraining said movement.

8. A forage harvester according to claim 7 wherein said floating bearing is biased into a downward direction by a spring.

9. A forage harvester according to claim 7 wherein said floating bearing is attached to the free end of a radius arm fixed to the machine.

10. A forage harvester according to claim 9 wherein the said radius arm is arranged at right angles to the said shaft.

* * * * *